July 29, 1941.  J. R. THORP ET AL  2,250,661
TRAILER COUPLING
Filed Sept. 1, 1939  2 Sheets-Sheet 1
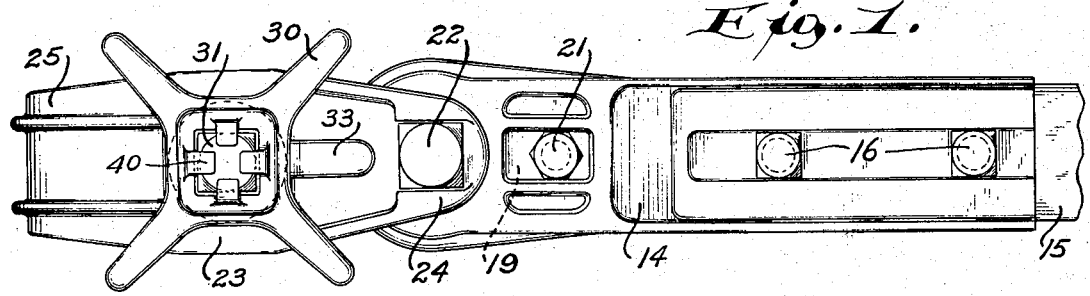
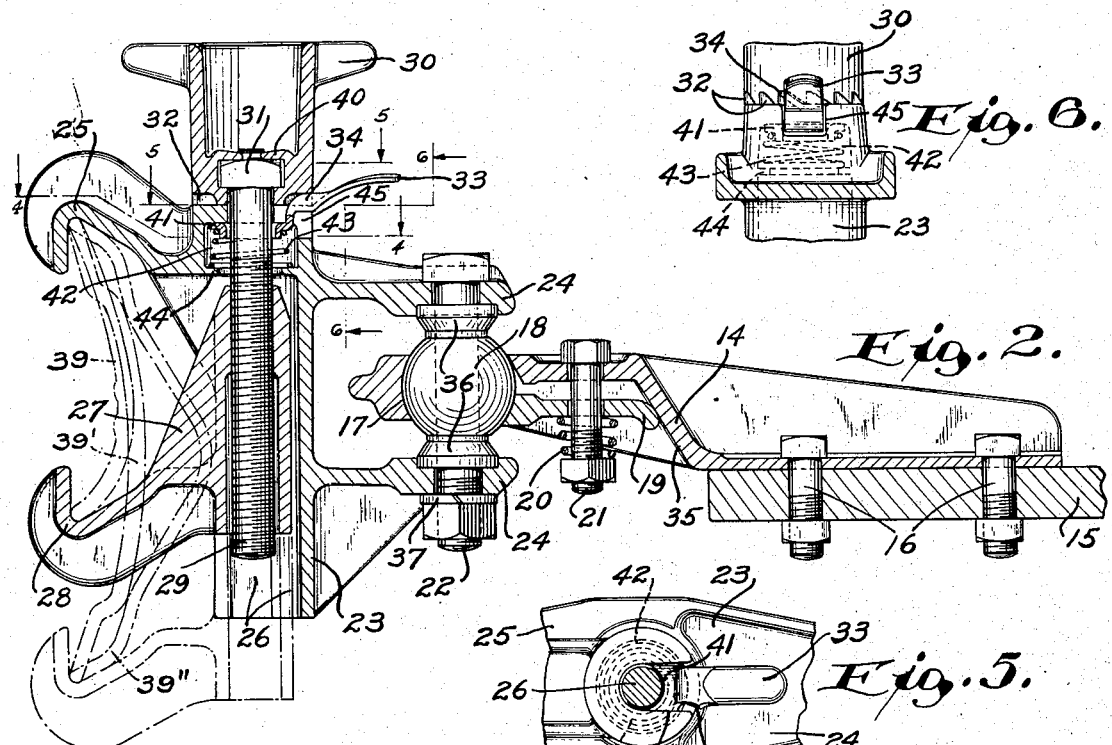
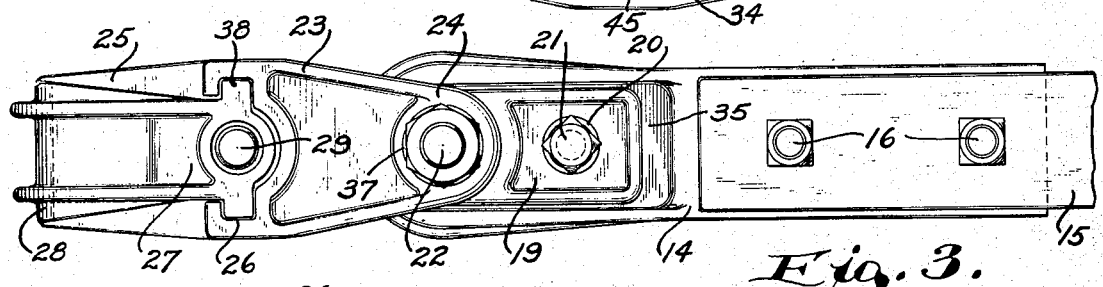
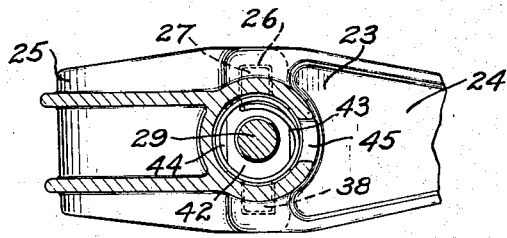
INVENTORS
J. R. Thorp
BY S. Strand
Morsell, Lieber & Morsell
ATTORNEYS July 29, 1941.   J. R. THORP ET AL   2,250,661
TRAILER COUPLING
Filed Sept. 1, 1939   2 Sheets-Sheet 2

INVENTORS
J. R. Thorp
BY S. Strand
Morsell, Lieber & Morsell
ATTORNEYS.

Patented July 29, 1941

2,250,661

UNITED STATES PATENT OFFICE 2,250,661

TRAILER COUPLING

Joel R. Thorp and Steen Strand, West Allis, Wis., assignors to The Fulton Company, West Allis, Wis., a corporation of Wisconsin Application September 1, 1939, Serial No. 293,004

7 Claims. (Cl. 280—33.15)

Our present invention relates generally to improvements in couplings for interconnecting vehicles, and relates more specifically to various improvements in the construction and operation of so-called trailer couplings for detachably connecting a trailer to an automobile or the like.

One of the more important objects of our present invention is to provide an improved vehicle coupling which is simple in construction, highly efficient in use, and which may be readily connected or disconnected.

Some of the more important specific objects of our invention are as follows:

To provide a new and useful quickly detachable trailer coupling, which is effectively locked in normal draft or hauling position.

To provide an improved vehicle coupling lock which will insure safe interconnection of two vehicles, but which may be conveniently released to permit rapid disconnecting without utilizing special tools.

To provide an improved manually manipulable spring latch for effectively retaining the parts of a trailer coupling or the like in properly adjusted relation to each other, without danger of having such parts accidentally disassociated due to jarring and jolting.

To provide an improved vehicle coupling of the ball and socket type, which is durable in construction and dependable in normal use.

To provide an improved automobile trailer coupling assemblage which may be quickly and conveniently applied to automobile bumpers of various types, and likewise detached therefrom.

To provide a simple and sturdy jaw coupling especially adapted for attachment to an automobile bumper or the like, and which will not subject the traction or the trailing vehicle to excessive stress or to objectionable thrust.

To provide various improvements in the construction and operation of automobile trailer couplings, whereby the cost of construction is minimized, while the efficiency thereof is enhanced to a maximum.

These and other objects and advantages of our present improvement, will be apparent from the following detailed description.

A clear conception of the several features constituting our present improvement, and of the mode of constructing and of utilizing several types of trailer couplings embodying our invention, may be had by referring to the drawings accompanying and forming a part of this specification wherein like reference characters designate the same or similar parts in the various views.

Fig. 1 is a top view of one of the improved jaw type couplings embodying our improved locking latch;

Fig. 2 is a central vertical longitudinal section through the jaw coupling of Fig. 1;

Fig. 3 is a bottom view of the jaw coupling of Figs. 1 and 2;

Fig. 4 is a horizontal section through the improved jaw coupling, the section being taken along the irregular line 4—4 of Fig. 2;

Fig. 5 is another horizontal section through the jaw coupling, the section being taken along the irregular line 5—5 of Fig. 2;

Fig. 6 is a transverse vertical section through the jaw coupling, taken along the line 6—6 of Fig. 2;

Figure 7:
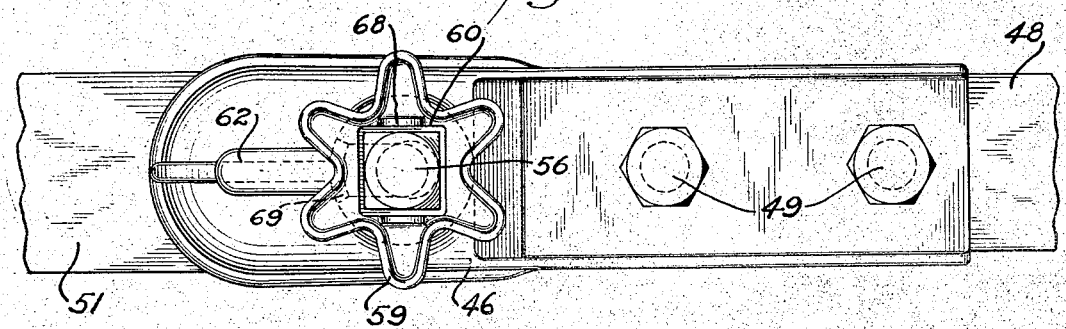
Fig. 7 is a top view of another type of our improved coupling provided with the new locking latch.

Although our invention has been shown and described herein as being specifically embodied in only two types of universal automobile trailer couplings, it is not our desire or intent to unnecessarily restrict the scope or utility of the improvement by virtue of such restricted disclosure.

Referring specifically to Figs. 1 to 6 inclusive of the drawings, the improved jaw type of vehicle coupling shown therein comprises in general a rear bracket member 14 formed for rigid attachment to a trailer draft bar 15 with the aid of bolts 16, and having therein a spherical zone surface or open socket 17; a ball or spherical element 18 normally movably confined within the socket 17 by a retainer plate 19 and a spring 20 and bolt 21 coacting with the plate 19; a bolt 22 piercing and snugly engaged by the ball element 18; a jaw member 23 having integral rear extensions 24 with which the bolt 22 coacts, and also having an integral front upper jaw 25 and a vertical guide groove 26 beneath the jaw 25; a movable jaw member 27 slidably confined within the groove 26 and having an integral lower jaw 28; a threaded jaw adjusting bolt or rod 29 having a screw threaded shank cooperable with a threaded opening in the jaw member 27; a manipulating hand wheel 30 secured to the headed upper end 31 of the rod 29 and having an annular series of radial teeth 32 at its lower end; and a manually releasable locking latch 33 having a latching portion 34 cooperable with the hand wheel teeth 32 to positively lock the hand wheel 30 and rod 29 against rotation.

The bracket member 14 is preferably reinforced by means of integral ribs in order to provide a draft bar of sufficient strength to withstand the loads to which it may be subjected, and the socket 17 should be dressed so as to permit free swivelling of the ball element 18 therein. The plate 19 has its forward end shaped to conform with the spherical element 18 and has its rear end rounded to rock upon the adjacent inclined surface 35 of the member 14, as shown in Fig. 2. The spring 20 which coacts with the plate 19 and with the nut of the bolt 21, serves to resiliently retain the ball element 18 within the socket 17 and also prevents the nut from being dislodged from the bolt 21 due to jarring. The ball element 18 which snugly embraces the bolt 22 is approximately spherical in shape and is spaced from the jaw member extensions 24 by means of collars 36 also snugly encircling the bolt 22. The bolt 22 is normally clamped in position by means of a nut and spring lock washer 37, and when this nut and washer 37 are removed, the bolt 22 may be withdrawn to permit free removal of the ball element 18 and of the spacing collars 36.

The jaw member 23 with its extensions 24, jaw 25 and lower grooved portion, is preferably formed as a single durable piece of metal, and the lower jaw member 27 is likewise of durable construction and has opposite elongated side rails 38 which are freely slidable in the grooves 26. The cooperating fixed and movable jaws 25, 28 are adapted to firmly engage various sizes, shapes and styles of automobile bumpers 39, 39', 39" as shown in dot-and-dash lines in Fig. 2. The hand wheel 30 which is attached to the upper headed end 31 of the rod 29 by means of distortable tongues 40, serves to rotate the threaded rod 29 so as to permit firm clamping of the jaws 25, 28 to a bumper, or release of the coupling jaws 25, 28 therefrom.

The manually operable locking latch 33 may be formed of relatively heavy sheet metal, and has a hub portion 41 which encircles the rod 29 and is confined within a pocket 42 formed in the upper portion of the jaw member 23. A helical compression spring 43 located within the pocket 42, has its upper end seated against the latch hub portion 41 while its lower end reacts against opposite side flanges 44 formed on the member 23, see Figs. 2, 4 and 5. The locking portion 34 of the latch 33 is disposed between the hub portion 41 and the handle, and is freely vertically movable within a slot 45 in the member 23; and by pressing upon the handle of the latch 33 the spring 43 will be compressed and the locking portion 34 will be withdrawn from the notches or teeth 32 of the hand wheel 30, thereby permitting free rotation of the latter for purposes of adjusting the lower jaw member 27. When the pressure on the handle of the latch 33 is released, the spring 43 will become quickly effective to cause the locking portion 34 to engage one of the teeth 32, thereby positively preventing rotation of the hand wheel 30 in the direction which causes movement of the jaw 28 away from the jaw 25. The hand wheel 30 may however be rotated in the opposite direction even when the latch portion 34 is engaging the teeth 32, and the latch 33 will then click over the crests of the successive teeth 32 until the jaws 25, 28 assume a vise-like grip upon the intervening bumper 39.

During normal use of the improved jaw type of coupling shown in Figs. 1 to 6 inclusive, and assuming the same to have been properly constructed, assembled and attached to a draft bar 15 and bumper 39, the jaws 25, 28 will firmly grip the bumper, and the locking latch 33 will positively prevent release of this grip during normal haulage of the trailer. The ball and socket connection between the jaw member 23 and the member 14, which is afforded by the spherical element 18 coacting with the socket 17, will permit the draft bar 15 to swing universally or in any direction relative to the bumper 39. The lock washer 37 will prevent loosening of the bolt 22, and the spring 20 will likewise prevent loosening of the bolt 21 while at the same time retaining the plate 19 pressed resiliently against the ball element 18. The jaws 25, 28 may obviously be firmly clamped to bumpers 39, 39', 39" of various sizes and shapes, and all parts of this improved jaw coupling assemblage may be readily removed or reassembled.

Referring specifically to the modified type of vehicle coupling shown in Figs. 7 to 10 inclusive, this assemblage comprises in general a main coupling member 46 having a downwardly open spherical front socket 47 and a rear shank formed for attachment to a trailer draft bar 48 by means of bolts 49; a ball member or spherical element 50 cooperable with the socket 47 and being attachable to the tongue 51 of a pulling vehicle by means of a bolt 52 snugly penetrating the element 50; a retainer plate 53 having a curved front surface cooperable with the ball member 50 and a rear headed end 54 cooperable with an inclined surface 55 of the member 46; a threaded rod or bolt 56 penetrating the member 46 and plate 53 and having a nut 57 cooperable therewith to hold the plate 53 in ball retaining position; a helical compression spring 58 embracing the shank of the bolt 56 and having an end engaging the plate 53; a hand wheel 57 having a polygonal socket 60 for receiving the head of the bolt 56, and also having a series of radial serrations or teeth 61 at its bottom; and a manually manipulable locking latch 62 having a locking portion 63 cooperable with the teeth 61 and also having a hub 64 embracing the bolt 56 and with which the opposite end of the spring 58 coacts.

The main coupling member 46 is preferably reinforced by ribs in order to provide a durable pulling element, and the socket 47 should be dressed to permit free swivelling of the ball member 50 therein. The front curved surface of the retainer plate 53 should be shaped to conform with the ball surface, and the headed end 54 of the plate 53 may slide along and rock upon the inclined surface 55 so as to permit the ball to freely oscillate within the spherical socket 47. The spring 58 which coacts with the plate 53, serves to resiliently confine the ball within the socket 47, and also prevents the nut 57 from becoming dislodged. The ball member 50 snugly fits the bolt 52, and this bolt has a head 65 provided with a spherical zone surface also fitting the socket 47. The bolt 52 may be clamped to the draw bar 51 by means of a nut and lock washer 66, and the ball member 50 may be readily removed from the socket 47 by merely turning coupling bolt 56 to release the nut 57, thereby permitting removal of the plate 53 and ball. The nut 57 is fitted within a recess 67 in the lower portion of the plate 53 so that it cannot rotate relative to this plate, and must be removed by rotation of the bolt 56.

The hand wheel 59 which coacts with the head of the bolt 56 may be provided with distortable lugs 68 for locking the bolt head within the square socket 60, so as to permit handling of the bolt 56 and hand wheel 59 as a unit. The locking latch 62 may be formed of sheet metal, and the upper end of the spring 58 which coacts with the latch 62 may be secured to the latch hub 64 as shown in order to permit the latch 62 and spring 58 to be handled as a unit during assembly and dismantling. In order to permit the latch 62 to be inserted and removed, the coupling member 46 is provided with a slot 69 within which the locking portion 63 is normally located, and the spring 58 is normally confined within the member 46 between the plate 53 and the latch hub 64.

Figure 8:
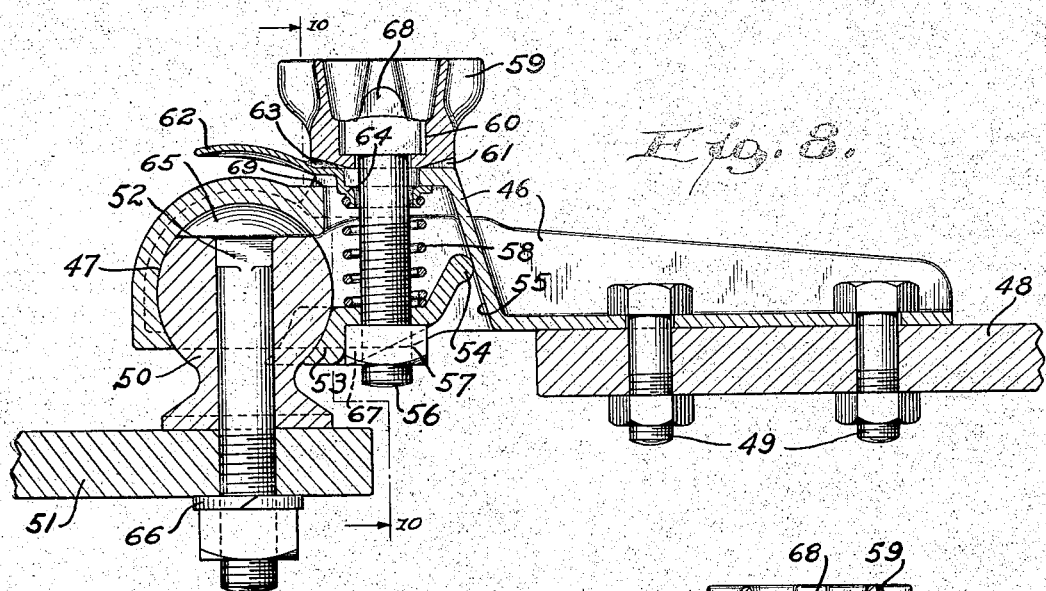
Fig. 8 is a central longitudinal vertical section through the coupling of Fig. 7, showing the improved locking latch in effective position.
Figure 10:
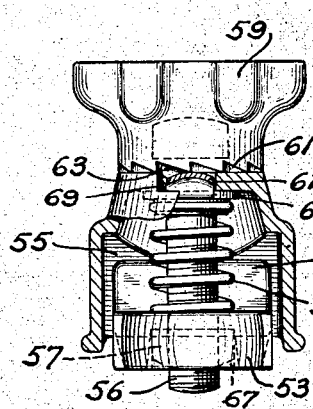
Fig. 10 is a transverse vertical section through the coupling of Fig. 8, taken along the irregular line 10—10.
Figure 9:
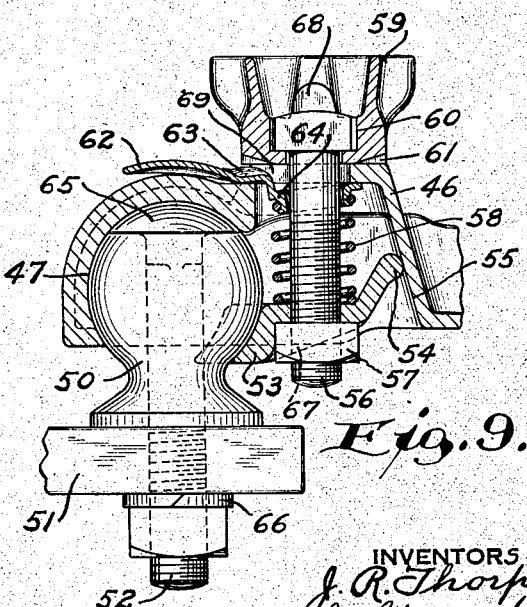
Fig. 9 is a similar section through a fragment of the coupling of Fig. 8, showing the locking latch released.

During normal use of the modified coupling shown in Figs. 7 to 10 inclusive, and assuming the structure to have been properly constructed, assembled and attached to draft bars 51, 48, the spherical member 50 will be confined within the socket 47 of the member 46 as shown in Fig. 8. The latch 62 will then have its portion 63 in engagement with the adjacent teeth 61 of the handle 59, and the spring 58 will be functioning to retain the latch 62 in this position, and will also react against the plate 53 so as to prevent jamming of the ball within the socket 47. The ball member 50 will then be free to oscillate within the socket 47 during normal haulage of the trailer by the propelling vehicle. If it becomes desirable to adjust the position of the plate 53, so as to reduce the clearance between the ball member 50 and the socket 47, it is only necessary to rotate the hand wheel 59 without manually releasing the latch 62, thereby causing the teeth 61 to click over the latch portion 63 and simultaneously cause the plate 53 to move upwardly. If it becomes desirable to release the plate 53, then the latch 62 must be shifted against the action of the spring 58 to the position shown in Fig. 9. The hand wheel 59 and bolt 56 may then be rotated in either direction, and by withdrawing the bolt 56 from within the nut 57, the plate 53 may obviously be entirely removed, thereby permitting removal of the ball from within the socket 47.

From the foregoing detailed description it will be apparent that our present invention provides an improved locking latch for coupling elements, which will positively prevent the elements of the coupling from separating during normal use of the assemblage. The latch may, however, be readily released to permit disconnection of the coupling, but during normal use this latch will provide a positive lock and thus insures maximum safety. The improved latch assemblage need not be manually operated when improving the union between the coupling elements, but will function automatically to prevent destruction of this union.

The improved jaw coupling specifically shown in Figs. 1 to 6 inclusive may obviously be readily attached to bumpers of different sizes and shapes, and both of the couplings shown permit limited universal movement of the trailer element with respect to the draft element. The improved couplings have proven highly satisfactory in actual commercial use, and both assemblages may obviously be readily assembled or dismantled and may also be readily adjusted to permit most efficient functioning thereof.

It should be understood that it is not desired to limit this invention to the exact details of construction or to the precise mode of use, herein shown and described, for various modifications within the scope of the claims may occur to persons skilled in the art.

We claim:

1. In a coupling, a pair of cooperating coupling members, a screw bolt having a turning element and being rotatable to effect coupling interconnection of said members, said turning element having an annular series of teeth revolvable about the bolt axis, a latch having a hub surrounding said bolt and also having a locking portion engageable with said teeth to prevent unscrewing of said bolt, and a spring embracing said bolt within one of said members and coacting with said latch to constantly urge the same into locking position.

2. In a coupling, a one-piece jaw member having integral vertically separated rear extensions and also having vertical guide grooves at its medial portion, a bolt having snug coaction with and being fixed relative to said extensions, a ball element pierced by said bolt and being located between said extensions, collars embracing said bolt between each of said extensions and said ball element, a draft member detachably swivelled upon said ball element, another jaw member slidable in said grooves, and a screw bolt for sliding said other jaw member in said grooves.

3. In a coupling, a one-piece jaw member having integral vertically separated rear extensions and also having vertical guide grooves at its medial portion, a bolt having snug coaction with and being fixed relative to said extensions, a ball element pierced by said bolt and being located between said extensions, collars embracing said bolt between each of said extensions and said ball element, a draft member detachably swivelled upon said ball element, another jaw member slidable in said grooves, a screw bolt for sliding said other jaw member in said grooves, and means for positively locking said bolt against unscrewing.

4. In a coupling, a one-piece jaw member having integral vertically separated rear extensions and also having vertical guide grooves at its medial portion, a bolt having snug coaction with and being fixed relative to said extensions, a ball element pierced by said bolt and being located between said extensions, collars embracing said bolt between each of said extensions and said ball element, a draft member detachably swivelled upon said ball element, another jaw member slidable in said grooves, a screw bolt for sliding said other jaw member in said grooves, and a manually releasable latch for locking said bolt in adjusted position.

5. In a coupling, two coupling members, a screw bolt having a gripping element for turning the same to effect interconnection of said members, said gripping element having a series of teeth, a latch having a locking portion cooperable with said teeth to lock said screw bolt against releasing movement relative to said members, said latch being provided with an integral manipulating handle for disengaging said locking portion from said teeth, and a spring embracing said screw bolt and coacting with said latch to constantly urge the same into locking position.

6. In a coupling, two coupling members, a screw bolt having a gripping element for turning the same to effect coupling interconnection of said members, said gripping element being rotatable about the bolt axis and having an annular series of end teeth closely adjacent to and radiating from said axis, a latch having a handle portion and a hub surrounding said bolt and being provided with a locking portion engageable with said teeth to prevent unscrewing of said bolt, said handle portion being manipulable to effect release of said latch, and spring means urging said latch axially of the bolt and toward locking position.

7. In a coupling, a pair of jaw members movable toward each other to engage a transverse draft bar, a screw bolt for moving said members to various positions of adjustment and having a turning element provided with teeth, and a latch having a rigid releasing handle and a hub surrounding said bolt and also having a locking portion normally cooperable with said element teeth to prevent separation of said jaw members.

JOEL R. THORP.
STEEN STRAND.